(12) United States Patent
Ebner

(10) Patent No.: US 6,409,485 B1
(45) Date of Patent: Jun. 25, 2002

(54) SYSTEM AND METHOD FOR SEALING AN ELECTRICAL CONNECTION BETWEEN A POWER CABLE AND A SUBMERSIBLE DEVICE

(75) Inventor: Paul D. K. Ebner, Shawnee, KS (US)

(73) Assignee: Camco International, Inc., Houston, TX (US)

( * ) Notice: Subject to any disclaimer, the term of this patent is extended or adjusted under 35 U.S.C. 154(b) by 9 days.

(21) Appl. No.: 09/587,808

(22) Filed: Jun. 6, 2000

(51) Int. Cl.[7] .................... F04B 17/00; H01R 13/40; H01R 13/58; H02K 5/10
(52) U.S. Cl. ............... 417/423.1; 417/423.11; 417/422; 439/587; 439/604; 310/87
(58) Field of Search ............... 417/423.1, 423.11, 417/422; 439/587, 604; 310/87

(56) References Cited

U.S. PATENT DOCUMENTS

| | | | |
|---|---|---|---|
| 2,320,708 A | 6/1943 | Yost | 417/423.11 |
| 2,624,286 A | 1/1953 | Smith | 417/422 |
| 3,736,548 A | 5/1973 | Double | 339/31 |
| 3,980,369 A * | 9/1976 | Panek | 339/28 |
| 4,128,735 A | 12/1978 | Zehren | 174/65 R |
| 4,610,737 A * | 9/1986 | Bacon et al. | 156/49 |
| 4,679,875 A | 7/1987 | Ramsey | 439/604 |
| 4,859,200 A | 8/1989 | McIntosh et al. | 439/275 |
| 4,927,386 A * | 5/1990 | Neuroth | 439/589 |
| 4,961,018 A | 10/1990 | Akhter | 310/87 |
| 5,113,101 A | 5/1992 | Liu et al. | 310/87 |
| 5,611,680 A | 3/1997 | Small et al. | 417/422 |
| 5,670,747 A * | 9/1997 | Lawer et al. | 174/74 R |
| 5,700,161 A | 12/1997 | Plummer et al. | 439/587 |

* cited by examiner

*Primary Examiner*—Charles G. Freay
*Assistant Examiner*—Michael K. Gray
(74) *Attorney, Agent, or Firm*—Fletcher, Yoder & Van Someren

(57) ABSTRACT

A sealing system that provides a secure seal against liquid transfer in harsh environments, such as those found in wellbore applications. The sealing system utilizes a connector housing having an axial passage. The interior passage is sized to receive at least a portion of a single support block. The support block is secured to the housing by a retainer, such as a packing gland or a plurality of screws. The single block includes axial openings to individually support and isolate the conductors of a power cable when the power cable is connected to a submersible component.

26 Claims, 5 Drawing Sheets

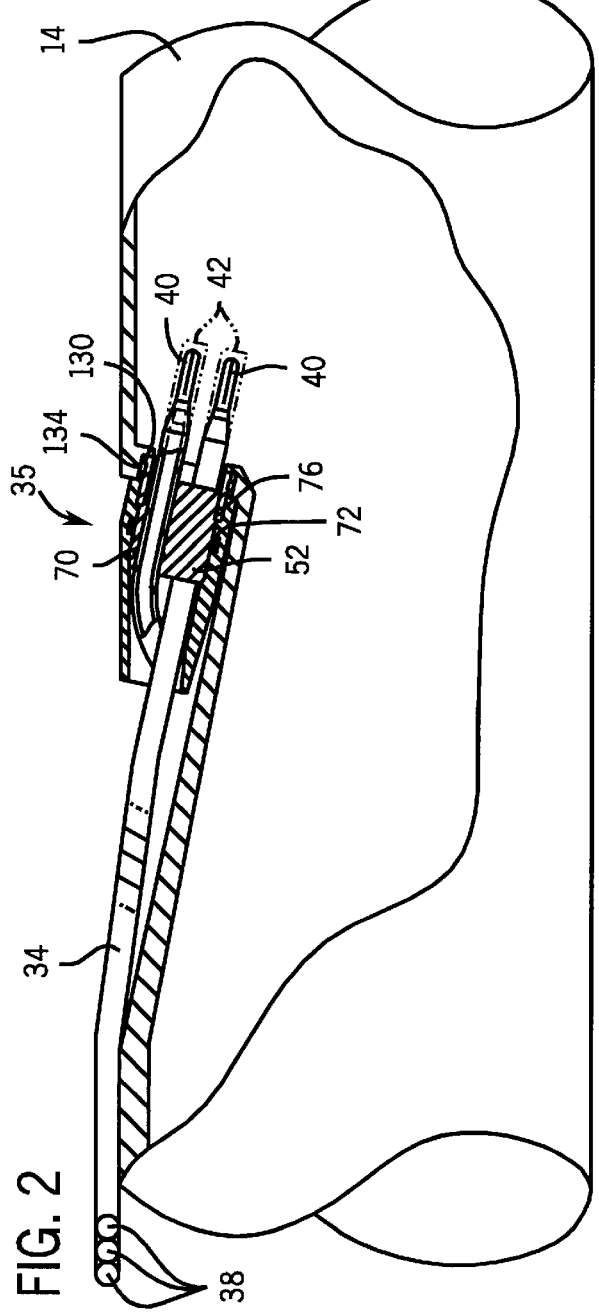
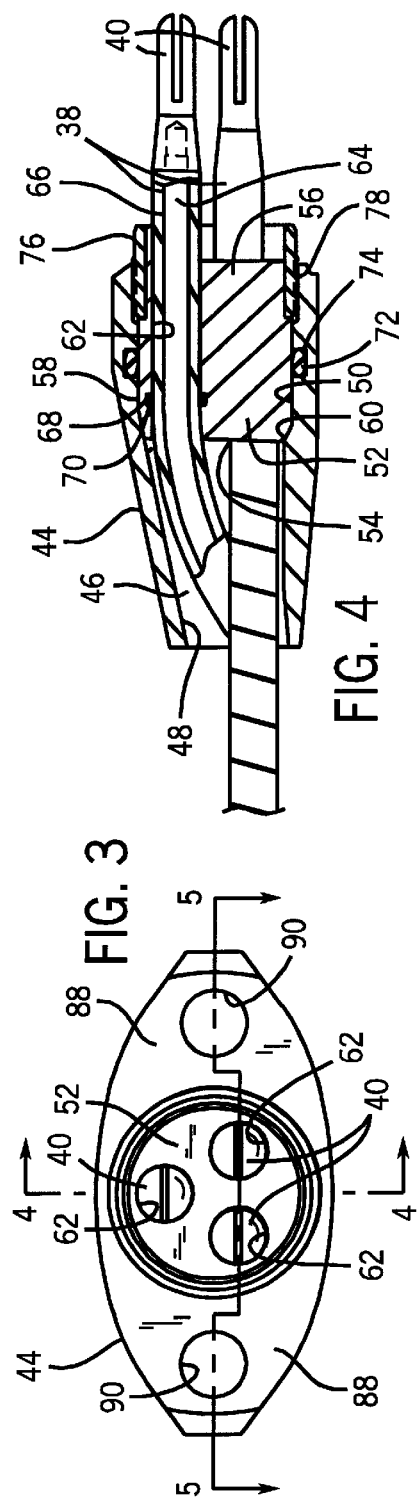

SYSTEM AND METHOD FOR SEALING AN ELECTRICAL CONNECTION BETWEEN A POWER CABLE AND A SUBMERSIBLE DEVICE

FIELD OF THE INVENTION

The present invention relates generally to a sealing system, such as a pothead, used to provide a high pressure seal between a power cable and a submersible component, e.g. a submersible electric motor.

BACKGROUND OF THE INVENTION

In a variety of applications, it is necessary to form liquid-tight seals between an electrical power cable and a component. For example, in subsurface production of liquids, such as oil, it may be necessary to provide electrical power to an electric submersible pumping system. Typically, a power cable is run downhole and connected to a submersible electric motor. The electric motor is powered to turn a centrifugal pump that intakes the production fluid and raise it or move it to a desired location, such as the surface of the earth.

In such applications, the electric submersible pumping system often is utilized within a wellbore at a location deep beneath the surface of the earth. In that type of environment, components are subjected to extreme pressures and often corrosive environments. Thus, it can be difficult to form a lasting, fluid-tight seal between the power cable and the submersible component, e.g. submersible motor.

In conventional connectors, e.g. potheads, the conductors of the power cable are disposed through a connector housing and through the outer housing of the submersible component for appropriate connection. Within the connector housing, a plurality of blocks are used to support the individual conductors. Typically, a soft block or blocks is disposed between a pair of relatively hard blocks. The hard blocks are utilized to squeeze the soft block until it forms a seal between the individual conductors and the interior surface of the connector housing. An additional seal or seals are used to prevent fluid flow between the connector and the submersible component housing. This connector design, however, is relatively complex and expensive to manufacture and utilize.

It would be advantageous to create a relatively simple connector for use in such high pressure, submerged environments.

SUMMARY OF THE INVENTION

The present invention features a pothead sealing system. The system includes a housing having an interior passage. A plurality of conductors extend through the interior passage and are supported by a single block disposed within the interior passage. The single block includes a plurality of openings for receiving the conductors therethrough. Additionally, a retainer is positioned to secure the single block at a desired position in the housing.

According to another aspect of the invention, a submersible pumping system is provided. The system includes a submersible pump and a submersible motor to power the submersible pump. A power cable is connected to the submersible motor, and a pothead is utilized to seal the power cable to the submersible motor. The pothead includes an outer housing and a single block disposed within the outer housing. The single block includes openings therethrough to receive the plurality of power cable conductors.

According to another aspect of the present invention, a method is provided for forming a sealed connection between a power cable having a plurality of conductors and a submersible component. The method includes placing the plurality of conductors through a connector housing. The plurality of conductors are individually supported by a unitary support block disposed at least partially within the connector housing. Additionally, the method includes attaching the connector housing to the submersible component.

BRIEF DESCRIPTION OF THE DRAWINGS

The invention will hereafter be described with reference to the accompanying drawings, wherein like reference numerals denote like elements, and:

FIG. 2 is a partial view of a submersible component, e.g. the submersible motor of FIG. 1, showing in partial cross-section the connection of the power cable thereto;

FIG. 3 is an end view of a connector, according to one embodiment of the present invention;

FIG. 4 is a cross-sectional view taken generally along line 4—4 of FIG. 3;

DETAILED DESCRIPTION OF THE PREFERRED EMBODIMENTS

Figure 1:
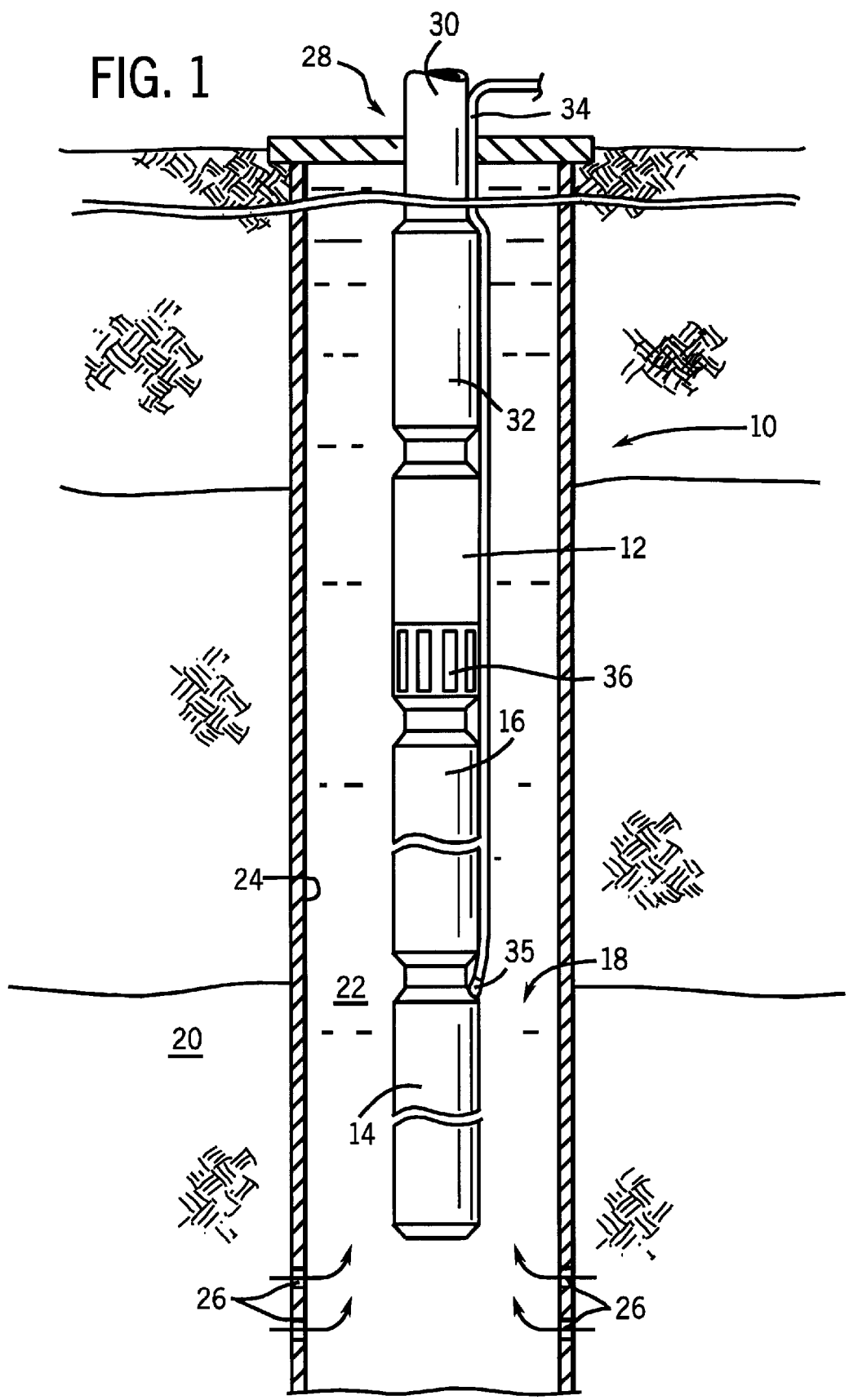
FIG. 1 is a front elevational view of a submersible pumping system disposed within a wellbore and powered via multiconductor power cable.

Referring generally to FIG. 1, an exemplary, high-pressure environment is illustrated. In this particular application, a power cable is coupled to a submersible pumping system in a downhole, wellbore environment by a connector, e.g. pothead, according to one embodiment of the invention. The pumping system may be an electric submersible pumping system 10. Typically, system 10 includes at least a, submersible pump 12, such as a centrifugal pump, a submersible motor 14 and a motor protector 16.

In the illustrated example, pumping system 10 is designed for deployment in a well 18 within a geological formation 20 containing desirable production fluids, such as petroleum. In a typical application, a wellbore 22 is drilled and lined with a wellbore casing 24. Wellbore casing 24 may include a plurality of openings 26 through which production fluids may flow into wellbore 22.

Pumping system 10 is deployed in wellbore 22 by a deployment system 28 that may have a variety of forms and configurations. For example, deployment system 28 may comprise tubing 30 connected to pump 12 by a connector 32. Power is provided to submersible motor 14 via a power cable 34 coupled to a submersible component, e.g., motor 14, by a power cable connector or pothead 35. Motor 14, in turn, powers centrifugal pump 12 which draws production fluid in through a pump intake 36 and pumps the production fluid to the surface via tubing 30.

It should be noted that the illustrated submergible pumping system 10 is merely an exemplary embodiment. Other components can be added to the system, and other deployment systems may be implemented. Additionally, the production fluids may be pumped to the surface through tubing 30 or through the annulus formed between deployment system 28 and wellbore casing 24. Also, power cable 34 may be coupled to other submersible components.

As illustrated in FIG. 2, a typical power cable 34 includes one or more conductors 38. In the embodiment illustrated, the power cable 34 has three conductors 38 for carrying three-phase power to a submersible component, such as motor 14. Of course, a variety of other power cables may be utilized for providing electrical power to a variety of components. Depending on the environment in which the component is utilized, a high-pressure resistant seal via connector 35 may be required.

In the example shown, power cable 34 extends into connector 35 where conductors 38 are separated and configured for connection with corresponding conductors internal to the submersible component, as known to those of ordinary skill in the art. For example, the conductors 38 may extend through connector 35 where they are terminated via a plurality of terminals 40. Terminals 40 are designed for plugging engagement with corresponding receptacles 42 of the submersible component as shown in dashed lines in FIG. 2.

As further illustrated in FIGS. 3 and 4, connector 35 includes an outer housing 44 having a hollow interior or interior passage 46 extending longitudinally therethrough. Interior passage 46 is defined by an internal wall 48.

Within interior passage 46, internal wall 48 defines a receiving area 50 configured to matingly receive a support block 52. Preferably, support block 52 is a unitary block extending from a first axial end 54 to a second axial end 56. In other words, block 52 is free of compressible layers between axial ends 54 and 56. In an exemplary embodiment, block 52 is made from a single material, such as monel, which is a nickel-based alloy that is conductive but non-magnetic.

Support block 52 includes an exterior surface 58 sized to slide into receiving area 50. Preferably, the base of receiving area 50 is defined by an abutment surface 60, such as a chamfered surface. Surface 60 prevents further movement of block 52 through interior passage 46 once it is located at the desired position within outer housing 44. Block 52 also includes a plurality of openings or passages 62 through which conductors 38 extend. Openings 62 typically are sized to receive both the conductive core 64 and any surrounding protective or insulative layers 66.

In the illustrated embodiment, at least one annular ring 68 may be formed along each passage 62 to receive a sealing member 70, such as a high-pressure O-ring. Additionally, at least one sealing member 72, such as a high-pressure O-ring, is disposed intermediate outer housing 44 and support 52. Typically, an annular ring 74 is formed in either internal wall 48 of housing 44, as illustrated, or in external surface 58 of block 52. Sealing members 70 and 72 cooperate to prevent the flow of fluids between the environment and submersible motor 14 even under the high-pressure, often harsh environments, encountered in a wellbore.

Figure 5:
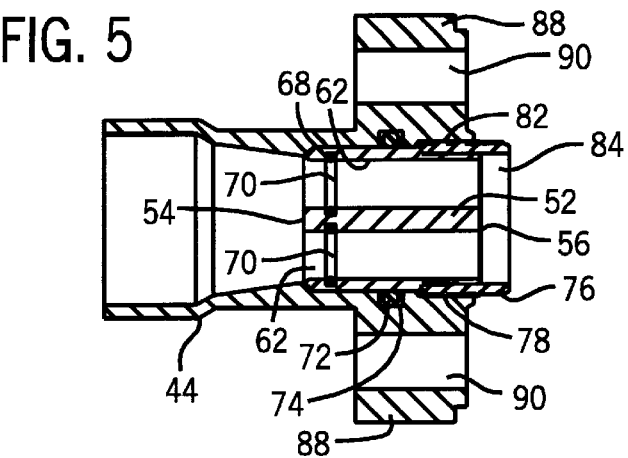
FIG. 5 is a cross-sectional view taken generally along line 5—5 of FIG. 3 with the power cable and individual conductors removed.
Figure 6:
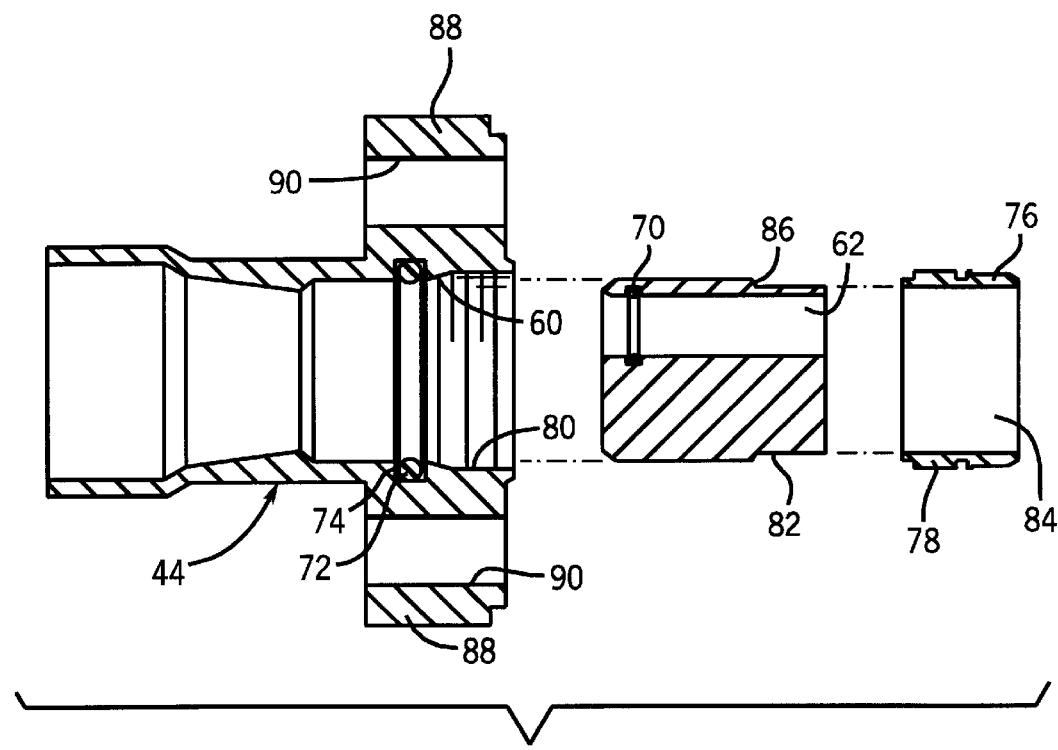
FIG. 6 is an exploded view of the connector illustrated in FIG. 3.

As illustrated best in FIGS. 4, 5 and 6, support 52 is securely held within outer housing 44 by a retainer 76. An exemplary retainer 76 is a packing gland having an externally threaded surface 78 designed for threaded engagement with an internally threaded region 80 disposed at the entrance of receiving area 50. In this embodiment, support block 52 includes an annular recessed area 82 formed generally at its second axial end. The diameter of annular recessed area 82 is selected to fit within the interior opening 84 of retainer 76. Thus, as retainer 76 is threaded into engagement with housing 44 it moves over annular recessed area 82 and into engagement with an abutment 86 at the axial end of recessed area 82. By tightening retainer 76 against abutment 86, support block 52 is securely moved into engagement with abutment surface 60 proximate its first axial end 54.

It should be noted that housing 44 may be designed in a variety of ways for engagement with submersible component 14. In the illustrated, exemplary embodiment, housing 44 includes a pair of flange portions 88 each having an axial hole 90 formed therethrough. Holes 90 are designed to receive conventional fasteners, such as bolts, that are threadably engaged with the housing of the submersible component, as known to those of ordinary skill in the art.

Figure 7:
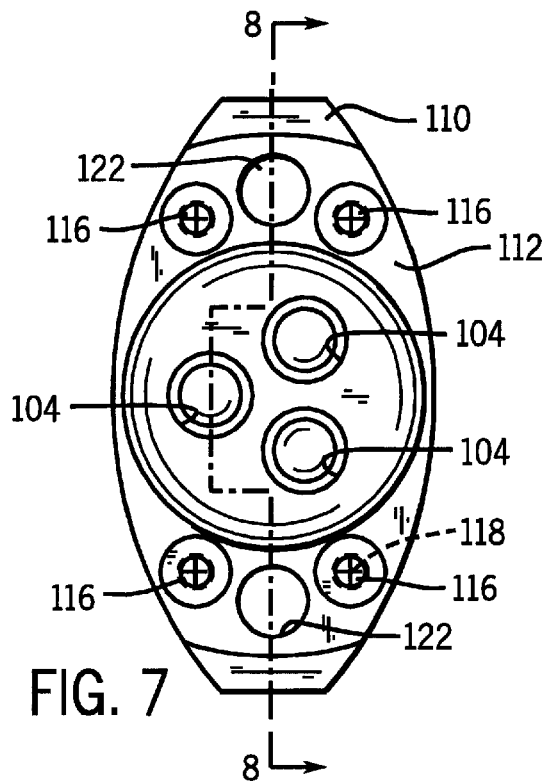
FIG. 7 is an end view of an alternate embodiment of the connector.
Figure 8:
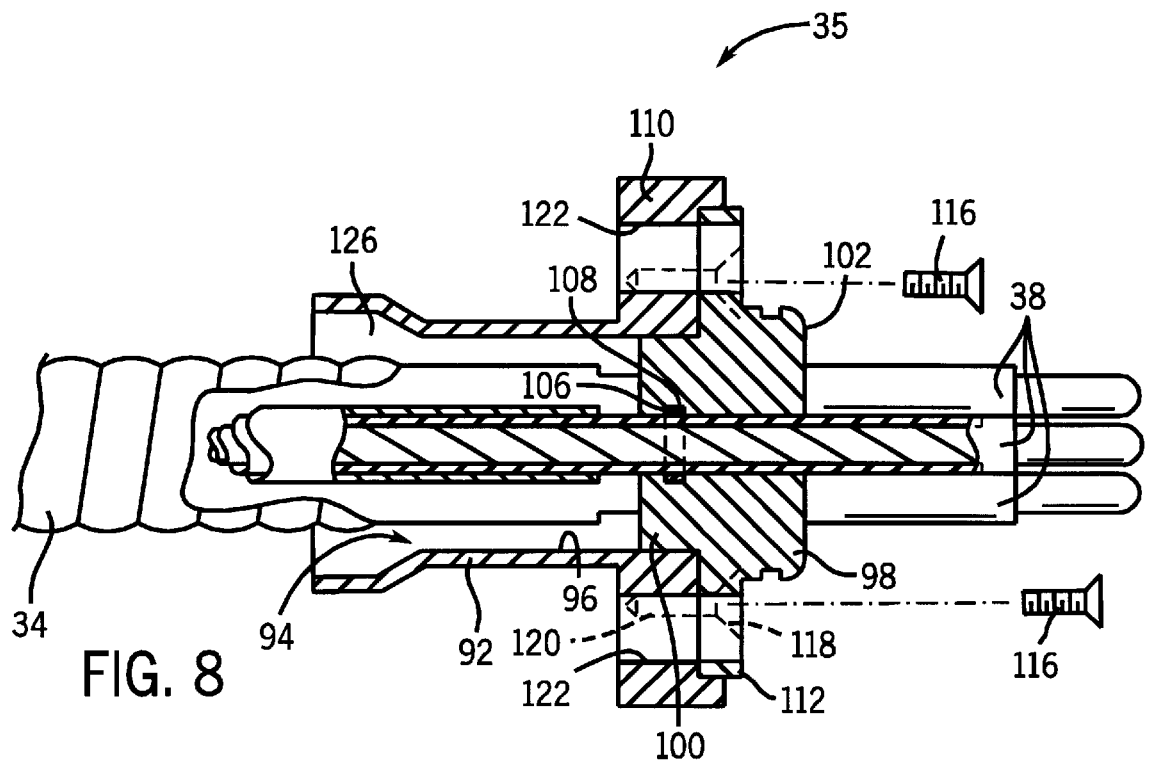
FIG. 8 is a cross-sectional view taken generally along line 8—8 of FIG. 7.
Figure 9:
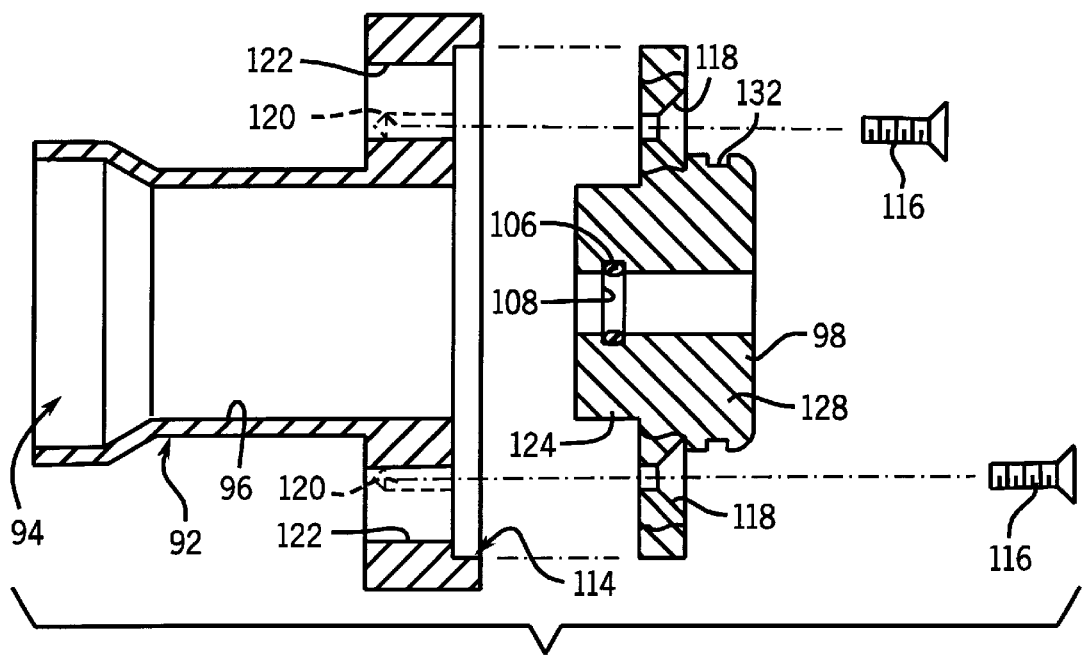
FIG. 9 is an exploded view of the connector illustrated in FIG. 7.

Referring generally to FIGS. 7, 8 and 9, an alternate embodiment of connector 35 is illustrated. In this embodiment, a housing 92 has an interior passage 94 defined by an interior wall surface 96. Power cable 34 extends into interior passage 94, and the individual conductors 38 extend through interior passage 94 as described above with reference to the embodiment illustrated in FIGS. 3–6. The individual conductors 38 are supported by a support block 98 that is formed as a unitary piece with no intermediate flexible members. As described above, support block 98 preferably is formed of a unitary material, such as monel. The unitary support block 98 extends between a first axial end 100, disposed within interior passage 94, and a second axial end 102 disposed outside housing 92.

Support block 98 includes a plurality of axial openings 104 for receiving individual conductors 38 therethrough. Preferably, at least one sealing member 106, such as an O-ring, is disposed between each conductor 38 and support block 98. For example, an annular groove 108 may be formed in support block 98 at a desired axial position along each of the openings 104 to receive the O-ring.

Housing 92 and support block 98 each include an outwardly extending flange region 110 and 112, respectively. As best illustrated in FIG. 9, housing flange portion 110 includes a cutout area 114 sized to receive support block flange portion 112 at least partially therein. Flange portion 112 is secured to housing flange portion 110 by a retainer, such as bolts 116. In the particular embodiment illustrated, support block flange portion 112 includes a plurality, e.g. four, axial passages 118 for receiving bolts 116 therethrough. Bolts 116 are threadably received in corresponding threaded openings 120 formed axially in housing flange portion 110. Additionally, flange portions 110 and 112 may include axial openings 122 for receiving bolts or other types of fasteners therethrough to attach connector 35 to the submersible component 14, as described above.

In this particular embodiment, support block 98 includes an insertion portion 124 sized for insertion into interior passage 94 until abutment of support block flange 112 with housing flange portion 110. Preferably, the remainder or at least a portion of interior passage 94 is filled with a filler material 126, such as lead, that fills the space between the interior wall 96 and power cable 34.

Support block 98 also includes an external portion 128 that extends from flange portion 112 in an axially opposite direction from insertion portion 124. External portion 128 is sized for insertion into a submersible component receptacle 130. (See FIG. 2). External portion 128 also may include a seal receiving area, such as an annular groove 132 sized to receive a sealing member 134 (see FIG. 2), such as the O-ring used with the embodiment illustrated in FIGS. 3–6. The sealing member 134 provides a seal between submersible component 14 and either retainer 76 (see embodiment of FIGS. 3–6) or external portion 128 (see embodiment of FIGS. 7–9) when connector 35 is securely attached to submersible component 14. In other words, receptacle 130 can be utilized with either of the alternate connector embodiments described above.

It will be understood that the foregoing description is of preferred exemplary embodiments of this invention, and that the invention is not limited to the specific forms shown. For example, a variety of materials and housing configurations maybe used according to the specific environments or applications. An arrangement of seal types and locations can be utilized in conjunction with the unitary block to prevent undesired transfer of liquids. Additionally, the connector system can be utilized with a variety of components that require a secure, pressure-resistant sealing system even if not utilized in a submersible component. These and other modifications may be made in the design and arrangement of the elements without departing from the scope of the invention as expressed in the appended claims.

What is claimed is:

1. A pothead sealing system, comprising:
a housing having an interior passage;
a plurality of conductors extending through the interior passage;
a single block disposed in the interior passage, the single block including a plurality of passages for receiving the plurality of conductors therethrough;
a retainer positioned to secure the single block at a desired position in the housing; and
a seal disposed between the interior passage and the single block.

2. The pothead sealing system as recited in claim 1, wherein the plurality of conductors comprises three conductors.

3. The pothead sealing system as recited in claim 1, further comprising a high-pressure seal disposed between the single block and the housing.

4. The pothead sealing system as recited in claim 1, further comprising a plurality of conductor seals, each conductor seal being disposed in one of the plurality of passage about the conductor extending therethrough.

5. The pothead sealing system as recited in claim 1, wherein the retainer comprises a threaded ring threadably engaged with the housing.

6. The pothead sealing system as recited in claim 2, wherein the single block comprises a conductive, non-magnetic material.

7. The pothead sealing system as recited in claim 6, further comprising a plurality of conductor seals, each conductor seal being disposed in one of the plurality of passage about the conductor extending therethrough.

8. The pothead sealing system as recited in claim 7, wherein the retainer comprises a threaded ring threadably engaged with the housing.

9. A submersible pumping system, comprising:
a submersible pump;
a submersible motor to power the submersible pump;
a power cable connected to the submersible motor; and
a pothead sealing the power cable to the submersible motor, the pothead including an outer housing and a single block of conductive metal disposed within the outer housing, wherein the single block includes openings therethrough to receive a plurality of power cable conductors.

10. The submersible pumping system as recited in claim 9, wherein the single block is formed of a uniform material.

11. The submersible pumping system as recited in claim 9, wherein the pothead further comprises a retainer to secure the single block at a desired position in the housing.

12. The submersible pumping system as recited in claim 11, further comprising a high-pressure seal disposed between the single block and the housing.

13. The submersible pumping system as recited in claim 9, wherein the single block comprises a conductive material.

14. The submersible pumping system as recited in claim 13, wherein the single block comprises a non-magnetic material.

15. The submersible pumping system as recited in claim 14, wherein the retainer comprises a threaded ring threadably engaged with the housing.

16. The submersible pumping system as recited in claim 11, wherein the retainer comprises a plurality of bolts.

17. The submersible pumping system as recited in claim 15, further comprising a plurality of conductor seals disposed within the openings.

18. A method for providing a sealed connection between a power cable having a plurality of conductors and a submersible component, comprising:
placing the plurality of conductors through a connector housing;
individually supporting each of the plurality of conductors by a unitary conductive metal support block disposed at least partially within the connector housing;
placing a seal between the block and the conductor housing; and
attaching the connector housing to the submersible component.

19. The method as recited in claim 18, further comprising placing a seal intermediate the submersible component and the plurality of conductors.

20. The method as recited in claim 19, wherein placing comprises locating the seal about the unitary support block.

21. The method as recited in claim 19, further comprising forming a seal between each of the plurality of conductors and the unitary support block.

22. The method as recited in claim 18, wherein attaching comprises attaching the connector housing to a submersible motor.

23. The method as recited in claim 18, wherein attaching comprises attaching the connector housing to a submersible motor powering an electric submersible pumping system.

24. The method as recited in claim 18, wherein individually supporting comprises supporting each of the plurality of conductors in a unitary support block formed of a relatively inflexible material.

25. The method as recited in claim 18, wherein individually supporting comprises supporting each of the plurality of conductors in a unitary support block formed of a material comprising monel.

26. The method as recited in claim 18, wherein placing comprises placing at least three conductors through the connector housing to carry three-phase current to the submersible component.

* * * * *